United States Patent [19]

Leighton et al.

[11] Patent Number: 4,623,120
[45] Date of Patent: * Nov. 18, 1986

[54] SAFE HIGH PRESSURE INSTRUMENT VALVE

[75] Inventors: Francis Leighton, Woodland Hills; Fred W. Trebes, Northridge, both of Calif.

[73] Assignee: Air Dry Corporation of America, Northridge, Calif.

[*] Notice: The portion of the term of this patent subsequent to May 28, 2002 has been disclaimed.

[21] Appl. No.: 715,075

[22] Filed: Mar. 22, 1985

Related U.S. Application Data

[63] Continuation-in-part of Ser. No. 610,424, May 15, 1984, Pat. No. 4,519,580, which is a continuation-in-part of Ser. No. 494,657, May 16, 1983, abandoned.

[51] Int. Cl.[4] .............................................. F16K 31/44
[52] U.S. Cl. ..................................... 251/223; 137/315
[58] Field of Search ................. 251/89, 221, 223, 225, 251/264, 273, 291, 297; 137/15, 243.5, 315

[56] References Cited

U.S. PATENT DOCUMENTS

| 394,424 | 12/1888 | Wilkinson . | |
|---|---|---|---|
| 427,244 | 5/1890 | Stone | 403/259 |
| 807,309 | 12/1905 | Ott . | |
| 928,751 | 7/1909 | Harcourt . | |
| 1,204,176 | 11/1916 | Mitchell . | |
| 1,391,012 | 9/1921 | Schulder . | |
| 1,989,083 | 1/1935 | Dahnken et al. | 287/53 |
| 2,097,698 | 11/1937 | Mohr | 251/44 |
| 2,610,820 | 9/1952 | Markel et al. | 251/49 |
| 2,796,881 | 6/1957 | Scheiwer | 137/315 |
| 2,895,495 | 7/1959 | Bryant | 137/315 |
| 3,031,216 | 4/1962 | Shaw | 403/259 |
| 3,204,925 | 9/1965 | Montuori | 137/315 |
| 3,415,550 | 12/1968 | Golden | 403/259 |
| 4,177,971 | 12/1979 | Landamore | 251/215 |
| 4,204,558 | 5/1980 | Johnson et al. | 137/315 |
| 4,519,580 | 5/1985 | Leighton et al. | 251/233 |

FOREIGN PATENT DOCUMENTS

| 737482 | 7/1943 | Fed. Rep. of Germany | 251/264 |
|---|---|---|---|
| 641240 | 4/1928 | France | 403/259 |
| D7574XII | 12/1950 | Netherlands . | |

OTHER PUBLICATIONS

Mil-v-24578 (SH), Military Specification Valves, Globe, Pressure Instrument, Stem Test, Connection, Union End, Oct. 13, 1978.

*Primary Examiner*—Samuel Scott
*Assistant Examiner*—Noah Kamen
*Attorney, Agent, or Firm*—Sheldon & Mak

[57] ABSTRACT

A globe valve having a main body, a bonnet, and a stem is provided with a mechanism that prevents the bonnet from being inadvertently backed off the main body. The mechanism includes a lock held to the body so that the lock is incapable of rotating as the stem is rotated, and means for releasably engaging the bonnet to the lock. For example, the lock can have a plurality of teeth that engage corresponding teeth on the bonnet. A locking ring can be used to hold the stem in the bonnet.

13 Claims, 8 Drawing Figures

SAFE HIGH PRESSURE INSTRUMENT VALVE

This application is a continuation-in-part of application Ser. No. 610,424 filed May 15, 1984, now U.S. Pat. No. 4,519,580, which is a continuation-in-part of application Ser. No. 494,657 filed May 16, 1983, now abandoned, both of which are incorporated herein by this reference.

BACKGROUND

The present invention is directed to valves, and in particular globe valves.

Globe valves are used for many applications, including as instrument valves for high pressure fluids such as oil and gas. Globe valves comprise a main body having an inlet, an outlet, and a passage between the inlet and the outlet. A bonnet is threaded onto the body and a stem is rotatable by a handle on the stem for opening and closing the passage.

A problem that has been experienced when opening a globe valve by rotating the stem is that the bonnet can be backed out of the body. This has resulted in inadvertent release of fluids having pressures as high as 6,000 to 10,000 psi, and has resulted in injury to operating personnel. Explosions can occur when the high pressure fluid is oil.

To overcome this problem, external releasable clamps are used to hold the bonnet to the body. However, when a valve having this clamp is disassembled for repair, often the clamp is not replaced, thereby destroying the safety mechanism. In operation, such a valve without the clamp replaced has had the bonnet backed off from the body and this has resulted in serious injury.

Although it is possible to design a valve where the bonnet can never be released from the body, such a valve would be wasteful in that it would be impossible to replace the packing, the washers of the valve, and to reseat the valve. Thus, instead of repairing the valve, it would be necessary to discard it.

Another problem with conventional valves is that the bonnet is swaged over the stem to prevent the stem from being turned out of the bonnet. However, this technique can fail, with resultant unexpected removal of the stem from the bonnet and escape of high pressure fluids.

In view of these problems, there is a need for a valve that includes a mechanism that prevents the bonnet from being unintentionally backed off, where the mechanism is an integral part of the valve and cannot be discarded when the valve is reassembled, and where the mechanism allows the bonnet to be removed from the body for repair of the valve. There is also need for a valve where the stem cannot be rotated out of the bonnet.

SUMMARY

The present invention is directed to a valve with these features. The valve comprises a main body having an inlet, an outlet, and a passage between the inlet and the outlet. The valve also includes a bonnet threaded onto the body and a stem rotatable within the body and the bonnet for opening and closing the passage. The valve has a locking element that is secured to the body so that the locking element is incapable of rotating as the stem is rotated. The valve includes means for releasably engaging the bonnet to the lock so that the bonnet cannot rotate as the stem is rotated.

In a preferred version of the invention, the locking element has a plurality of teeth that engage corresponding teeth on a lock that is secured to the bonnet. The locking element is biased into engagement with the lock by springs. By pressing on the locking element, the lock can be released from the locking element so that the valve can be disassembled.

Because the locking element is secured and fixed to the body, it cannot be removed to defeat the purpose of the lock. This is unlike the prior art clamp mechanism. Moreover, the valve can easily be repaired by disengaging the locking element from the lock to allow the bonnet to be backed off the body.

A locking ring can be used to hold the stem in the bonnet.

Thus the lock mechanism of the present invention results in a safe valve with a bonnet and a stem that cannot be unintentionally backed off, but which can easily be repaired, and where the safety mechanism cannot be defeated.

DRAWINGS

These and other features, aspects, and advantages of the present invention will become better understood with reference to the following description, appended claims, and accompanying drawings where:

DESCRIPTION

The present invention is directed to a valve having a locking mechanism that prevents unintentional disassembly of the valve. Although the present invention will be described with regard to the globe valve shown in the Figures, which is a valve particularly adapted for high pressure instrument lines, it will be appreciated that the invention is useful for all types of valves used on all types of fluids, including low pressure and high pressure fluids.

Figure 1:
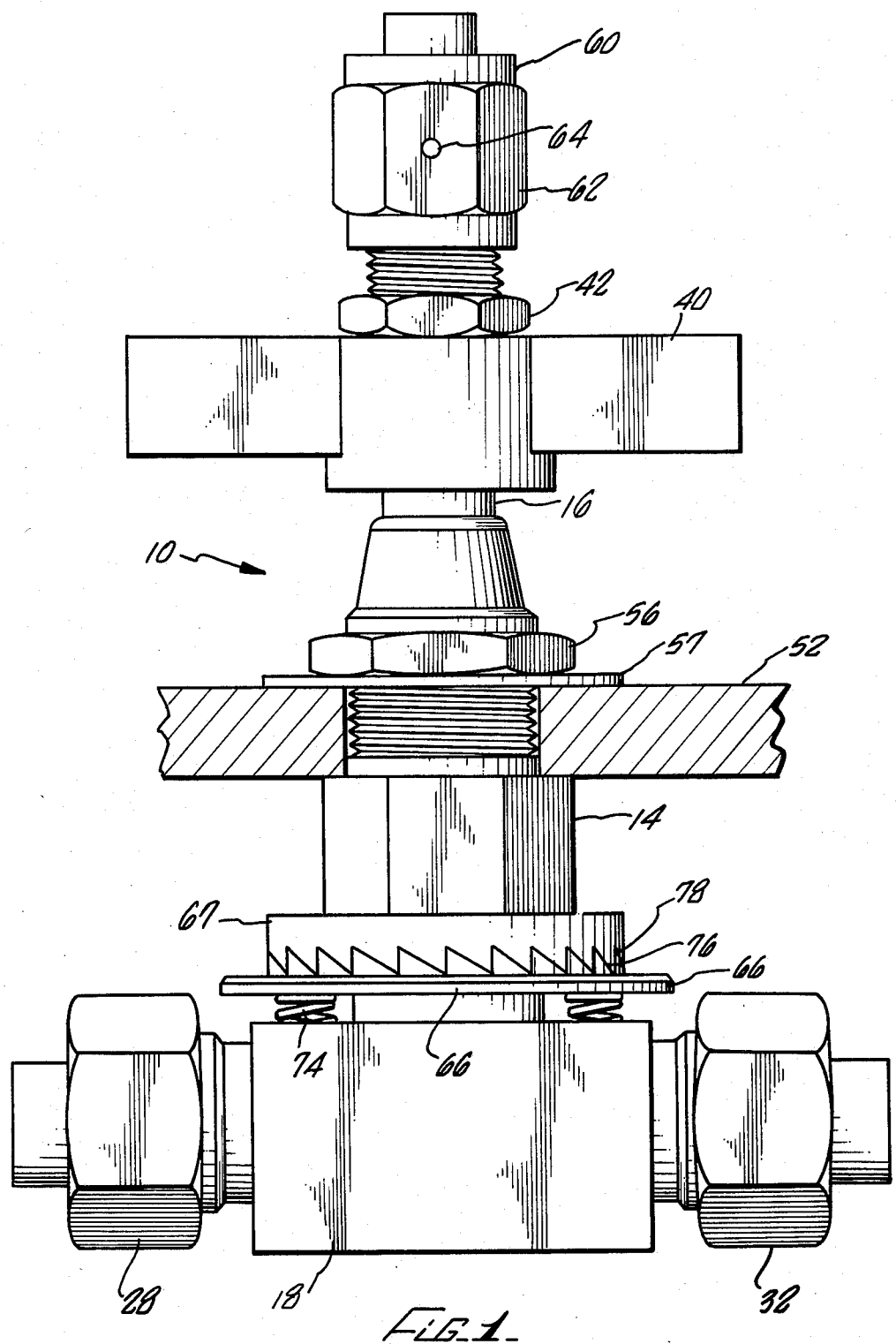
FIG. 1 is a front elevation view of a valve according to the present invention.
Figure 2:
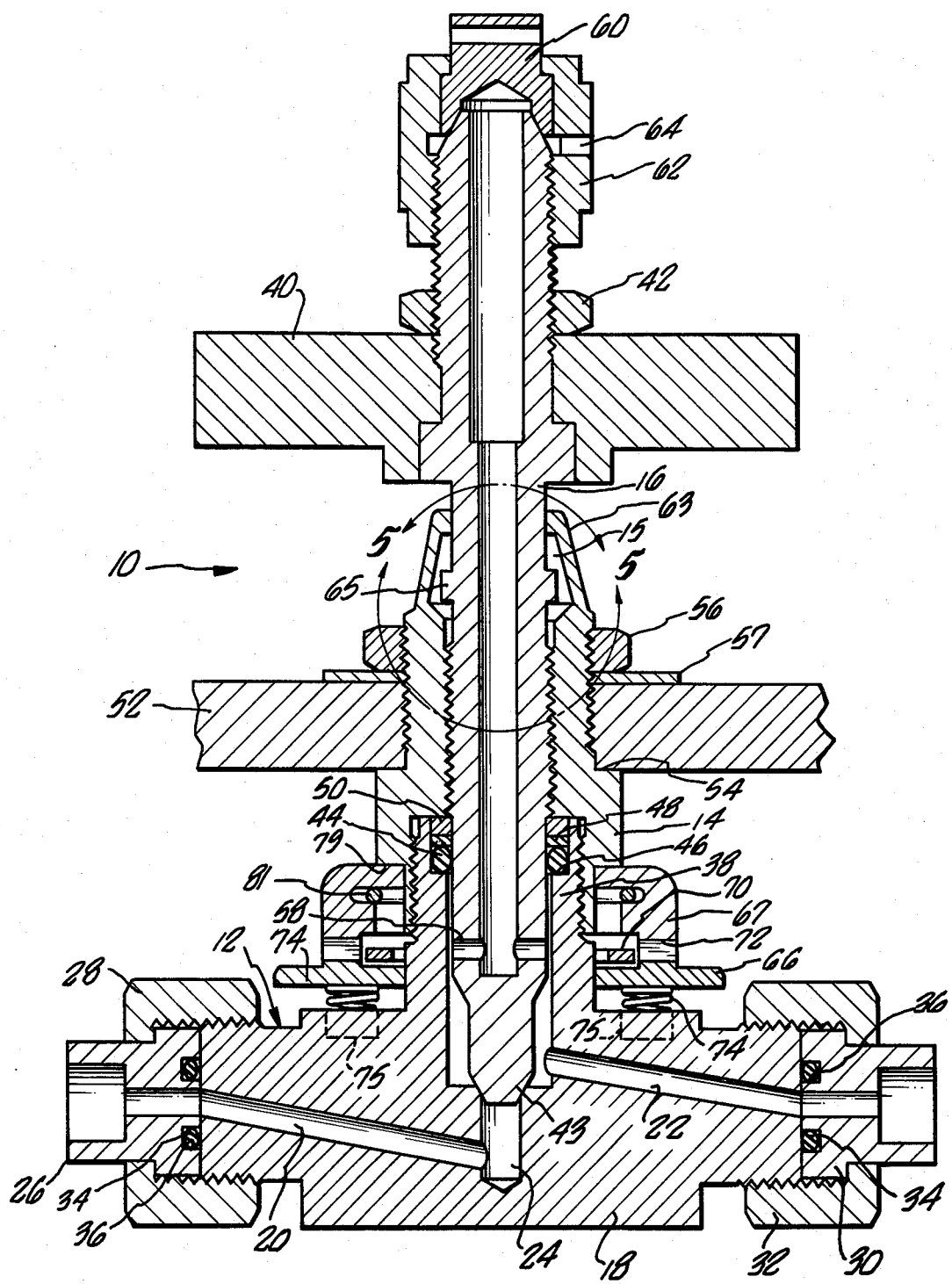
FIG. 2 is a sectional view of the valve of FIG. 1.

With reference to FIGS. 1 and 2, a globe valve 10 comprises as its main components a body 12, a bonnet 14 threaded onto the body 12, and a stem 16 rotatable within the body 12 and the bonnet 14.

The body 12 includes a base portion 18 having an inlet passage 20 and an outlet passage 22 with a connecting passage 24 therebetween. An inlet tail piece 26 is secured to the body 12 at the inlet passage 20 by an inlet nut 28 and an outlet tail piece 30 is secured to the body 12 by an outlet nut 32. Packing 34 is provided in a recess 36 of each tail piece adjacent to the body 12 to prevent fluid leakage.

The body includes an upstanding, exteriorly threaded projection 38 onto which is threaded the bonnet 14. The bonnet 14 is generally annular in configuration and within the annulus 15 is located the stem 16 which has exterior threads which engage interior threads of the bonnet. The stem 16 includes a handle 40 held in place by a handle nut 42. By means of the handle 40, the stem is rotated within the bonnet and the body for opening and closing the connecting section 24 between the inlet passage 20 and the outlet passage 22. In FIG. 2, the valve is shown with the nose 43 of the stem in a seated position. By rotating the stem in a counterclockwise direction (as viewed from above), the stem is raised away from the connecting section and the valve is opened.

Packing 44 is provided in a recess 46 in the projection 38 of the body 12 adjacent to the stem 16 to prevent fluid leakage out of the valve when the valve is opened. The packing is held in place by a backup ring 48 and a spacer 50.

The valve is mounted on a panel 52, the underside of which seats against a ledge 54 on the bonnet. The valve is mounted onto panel 52 by a mounting nut 56 and a washer 57. The mounting nut 56 is threaded onto the outside of the bonnet 14.

The stem 16 is hollow for most of its length and is provided with openings 58 through its wall proximate to the outlet passage 22 so that when the valve is opened fluid passes into the interior of the stem. The end of the stem is closed by a cap 60 held in place by a nut 62 threaded onto the exterior of the stem.

When the valve 10 is used for an instrument such as a pressure gauge, the instrument can be calibrated with the valve 10. This is accomplished by having the stem in the closed position, removing the cap 60, and connecting the end of the stem to a source of a known pressure. Because the stem is hollow and because of the openings 58, a gauge connected to the outlet tail piece 30 registers the known pressure.

As shown in FIGS. 1 and 2, the cap nut 62 has an opening 64 therethrough so that as the nut 62 is released, any built-up pressure is released. Also, if for some reason the stem is not seated, fluid will continually pass through the opening 64, thereby alerting the operator of the problem before the cap is removed.

As shown in FIG. 2, the top portion 63 of the bonnet 14 is swaged toward the stem 16 to prevent the stem from being rotated out of the bonnet by engagement with an expanded portion 65 of the stem.

Figure 3:
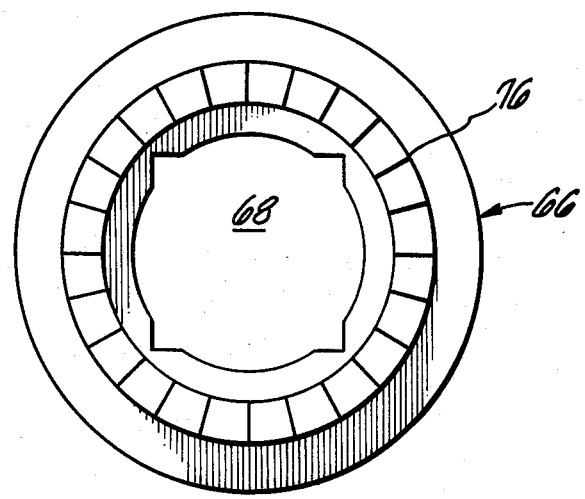
FIG. 3 is a bottom elevation view of the lock of the valve of FIG. 1.
Figure 4:
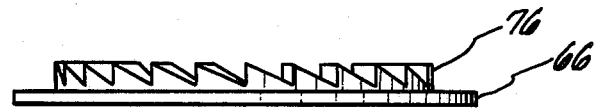
FIG. 4 is a side elevation view of the lock of FIG. 3.

The valve includes a lower locking element or plate 66 and an upper lock 67. The locking plate is mounted around the projection 38 of the body 12 where the projection intersects the base 18. As shown in FIG. 3, the locking plate 66 is generally annular, although its center hole 68 is not circular so that it cannot rotate about the projection 38 of the body. The projection 38 is basically circular in cross-section, but in the region of the locking plate 66 is shaped to match the center hole 68. The locking plate 66 is held in place on the body by a retaining ring 70.

The locking plate 66 faces the underside 72 of the lock 67 and is biased towards the lock 67 by a four springs 74 mounted in recesses 75 of the body 12.

The locking plate 66 has a plurality of teeth 76 that engage corresponding teeth 78 on the underside 72 of the lock 67.

The lock 67 is mounted around the lower portion of the bonnet 14 against a shoulder 79 of the bonnet 14. The lock 67 is held in place on the bonnet by a wire retainer 81.

The bonnet 14 cannot inadvertently be backed off the body 12 because the locking plate 66 cannot rotate relative to the body, and because of the interlocking teeth of the lock 67, the bonnet 14 cannot rotate unless the locking plate rotates.

However, even with the locking plate and interlocking teeth, the valve 10 can be disassembled. This is easily accomplished by forcing the locking plate toward the base portion 18 of the body against the force of the springs 74. This temporarily disengages the locking plate from the lock and allows the bonnet to be removed. Because of the retaining ring 70, the locking plate 66 remains as part of the valve body, and is available for reengaging the lock when the valve is reassembled. Thus, the safety mechanism comprising the locking plate is difficult to defeat.

Besides interengaging teeth, other mechanisms for preventing the bonnet from rotating can be used. For example, a single tooth or projection rather than a plurality of teeth can be provided both on the lock and the locking plate. Frictional engagement such as that resulting from use of a gall prone material can be provided. A pawl and ratchet system, or a clutch mechanism, or mating prongs can be used.

Figure 5:
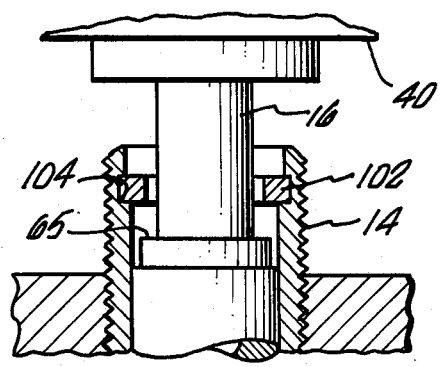
FIGS. 5 and 6 show alternate version of the valve of FIG. 2 in region "5" shown in FIG. 2.
Figure 6:
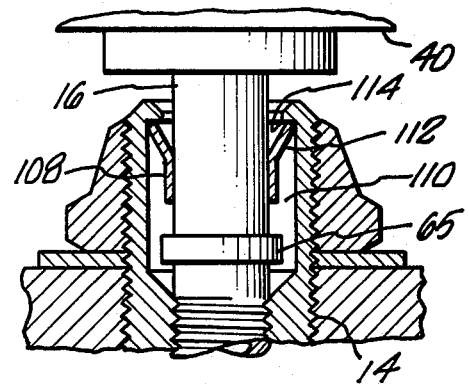
Figure 7:
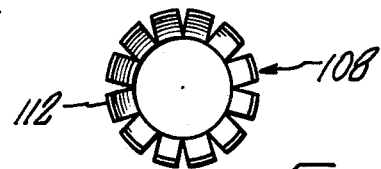
FIG. 7 is a top plan view of a locking ring used in the version of the invention shown in FIG. 6.

With reference to FIGS. 5 and 6, rather then swaging the bonnet, or in addition to swaging, alternate locking mechanisms can be used to hold the stem 16 in the bonnet 14. As shown in FIG. 5, a locking ring 102 can be placed in a groove 104 in the inner peripheral wall of the bonnet at its top portion. This ring is sized to engage the expanded portion 65 of the stem, thereby securely preventing the stem from unintentionally being rotated out of the bonnet.

Alternatively, as shown in FIG. 6, a floating segmented ring 108 can be placed in the generally annular region 110 between the upper portion of the bonnet and the stem. The segments 112 of the ring angle radially outwardly to engage a shoulder 114 at the top of the bonnet. As the ring engages the expanded portion 65 of the stem, the ring prevents the stem from being rotated out of the bonnet.

Figure 8:
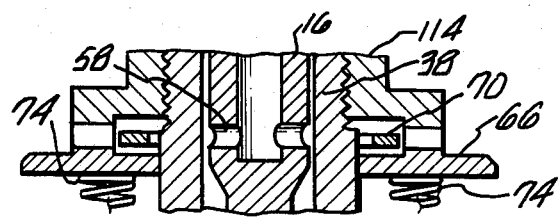
FIG. 8 is a sectional view of a portion of a valve similar to the valve of FIG. 1.

Although the present invention has been described in considerable detail with reference to certain preferred versions thereof, it is clear that alternate versions of the present invention can be used. For example, as shown in FIG. 8, the bonnet can be made as a single part 114. Thus the spirit and scope of the appended claims should not necessarily be limited to the description of the preferred versions contained herein.

What is claimed is:

1. A valve comprising:
  (a) a body having an inlet, an outlet, and a passage between the inlet and the outlet;
  (b) a bonnet threaded onto the body;
  (c) a stem rotatable within the bonnet such that the stem is capable of blocking the passage; and
  (d) an integral, releasable locking means between the body and the bonnet for preventing the bonnet from being inadvertently threaded off the body, wherein the locking means comprises:
   (i) a locking element nonrotatably attached to the body such that when the bonnet is detached from the body the locking element remains nonrotatably attached to the body;
   (ii) a lock nonrotatably attached to the bonnet, such that when the bonnet is detached from the body the lock remains nonrotatably attached to the bonnet; and
   (iii) means for releasably engaging the lock and the locking element.

2. The valve of claim 1 wherein the lock and the locking element each have at least one interengaging tooth.

3. The valve of claim 2 wherein the locking element has a plurality of teeth and the lock has a plurality of teeth capable of nonrotatable engagement with the locking element teeth.

4. The valve of claim 3 in which the teeth are adapted so that the locking means does not prevent the bonnet from being threaded onto the body.

5. The valve of claim 1 in which the locking means does not prevent the bonnet from being threaded onto the body.

6. The valve of claim 1 wherein the body comprises a projection and the means for releasably engaging the lock and the locking element includes slideably attaching the locking element to the projection and using a biasing means urging the locking element against the lock.

7. The valve of claim 1 including a locking ring mounted in a groove in the bonnet for engaging an expanded portion of the stem to prevent the stem from being rotated out of the bonnet.

8. The valve of claim 1 in which there is a generally annular region between the top portion of the bonnet and the stem, and including a ring in the annular region for engaging an expanded portion of the stem for preventing the stem from being rotated out of the bonnet.

9. The valve of claim 6 in which the biasing means comprises at least one spring.

10. The valve of claim 1 in which the lock and the bonnet are integral.

11. The valve of claim 1 in which the lock and the locking element provide a pawl and ratchet system.

12. A valve comprising:
(a) a body having an inlet, an outlet, and a passage between the inlet and the outlet;
(b) a bonnet threaded onto the body;
(c) a stem rotatable within the bonnet such that the stem is capable of blocking the passage; and
(d) an integral, releasable locking means between the body and the bonnet for preventing the bonnet from being inadvertently threaded off the body but not interfering with the bonnet being threaded onto the body, the locking means comprising:
  (i) a locking element nonrotatably attached to the body such that when the bonnet is detached from the body the locking element remains nonrotatably attached to the body;
  (ii) a lock nonrotatably attached to the bonnet, such that when the bonnet is detached from the body the lock remains nonrotatably attached to the bonnet;
  wherein the lock and the locking element each have a plurality of interengaging teeth, the teeth when interengaging preventing the bonnet from being rotated off the body, but not preventing the bonnet from being threaded onto the body; and
  (iii) releasable biasing means comprising at least one spring biasing the lock into engagement with the locking element.

13. The valve of claim 12 in which the lock and bonnet are integral.

* * * * *